United States Patent [19]

Leeson

[11] 4,132,165
[45] Jan. 2, 1979

[54] FUEL SUPPLY SYSTEM FOR A MISSILE OR THE LIKE

[75] Inventor: Plato J. Leeson, Rockford, Ill.

[73] Assignee: Woodward Governor Company, Rockford, Ill.

[21] Appl. No.: 730,806

[22] Filed: Oct. 8, 1976

[51] Int. Cl.² .............................................. F42B 13/00
[52] U.S. Cl. .................................. 102/49.8; 60/39.48; 60/225; 60/250
[58] Field of Search .................. 60/39.48, 225, 250; 102/49.8

[56] References Cited

U.S. PATENT DOCUMENTS

| 2,711,630 | 6/1955 | Lehman | 60/250 |
| 2,987,875 | 6/1961 | Fox | 60/39.48 |
| 3,197,959 | 8/1965 | Keller | 60/224 |

Primary Examiner—Verlin R. Pendegrass
Attorney, Agent, or Firm—Leydig, Voit, Osann, Mayer & Holt, Ltd.

[57] ABSTRACT

A missile is initially propelled through space by the burning of solid fuel in a combustor. The heat produced by the combustion of such fuel is used to vaporize a liquid, the pressurized vapor being used to pump liquid fuel to the combustor after the solid fuel has been depleted.

6 Claims, 1 Drawing Figure

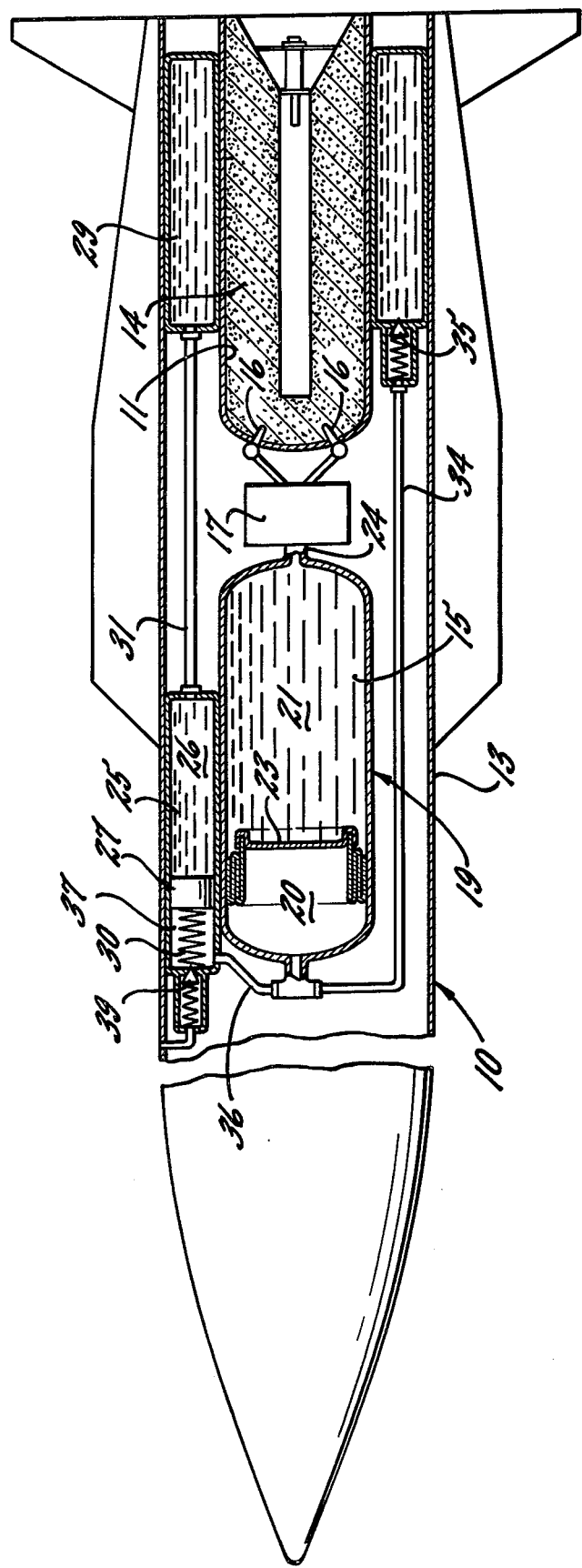

FUEL SUPPLY SYSTEM FOR A MISSILE OR THE LIKE

BACKGROUND OF THE INVENTION

This invention relates to a system for supplying fuel to the propulsion combustor of a device such as a missile adapted to be propelled through space. The invention relates more particularly to a system for supplying liquid or gaseous fuel to a missile of the type which is adapted to be initially propelled by combustion of a solid propellant or other energy source and then propelled by combustion of the liquid or gaseous fuel supplied by the system of the present invention.

SUMMARY OF THE INVENTION

The general aim of the present invention is to provide a reliable and comparatively simple system for pressurizing the secondary liquid or gaseous fuel and for pumping the secondary fuel to the propulsion combustor after the primary fuel has been ignited.

A further object is to take advantage of the heat produced by combustion of the primary fuel and to effectively utilize such heat to pressurize and pump the secondary fuel. As a result, the need for a motor driven or an inefficient air driven pump is avoided.

A more detailed object is to utilize the heat to vaporize a liquid, the pressurized vapor acting against a piston or the like to effect pumping of the secondary fuel.

The invention also is characterized by the novel provision in the system of means for initiating pumping of the secondary fuel and of means for controlling the flow rate of the secondary fuel.

These and other objects and advantages of the invention will become more apparent from the following detailed description when taken in conjunction with the accompanying drawing.

BRIEF DESCRIPTION OF THE DRAWING

The single FIGURE of the drawing is an elevational view of an exemplary missile equipped with a new and improved fuel supply system incorporating the unique features of the present invention, part of the missile being shown in section and the fuel supply system being shown schematically.

DETAILED DESCRIPTION OF THE PREFERRED EMBODIMENT

For purposes of illustration, the invention is shown in the drawings as incorporated in a system for supplying fuel to a device such as a missile 10 which is adapted to be propelled through space by combustion of the fuel within a combustion chamber or combustor 11. The fuel supply system of the present invention is not concerned with the construction of the missile 10 per se and thus the missile has been illustrated and will be described only in sufficient detail as is necessary to gain an understanding of the present invention. Accordingly, it will suffice to say that the missile includes a rocket-shaped body 13 whose tail portion is formed with a rearwardly opening tunnel defining the combustor 11. When fuel is burned in the combustor, the products of combustion produce a high velocity jet out of the rear of the combustor to cause the missile to be propelled through space.

With the particular missile 10 which has been shown, initial propulsion is produced by igniting and burning a primary energy source such as a solid propellant fuel 14 in the combustor 11. Thereafter, liquid fuel 15 is pumped into and is ignited within the combustor and serves to propel the missile after the solid propellant has been depleted or nearly depleted.

In accordance with the present invention, the heat produced by the burning of the primary fuel or solid propellant 14 is used to pressurize the secondary or liquid fuel 15 and to deliver such fuel to the combustor 11. By utilizing the heat of combustion to pressurize the liquid fuel, the need for using an unreliable turbine driven pump or other power driven pump is eliminated and the overall fuel supply system is simplified.

More specifically, the liquid fuel supply system for the missile 10 includes a plurality of nozzles 16 by which the fuel 15 is injected into the combustor 11, the flow rate of the fuel being regulated by a fuel control indicated generally by the reference numeral 17. Fuel is supplied to the fuel control from a reservoir or tank 19 and, in carrying out the invention, the tank is divided into two compartments 20 and 21 by a pumping element or piston 23 which herein is in the form of a resiliently yieldable diaphragm extending across the tank and serving to seal the compartment 20 from the compartment 21. The compartment 21 contains the fuel 15 and communicates with the fuel control 17 via an outlet line 24.

In keeping with the invention, a supply 25 of liquid is vaporized by the heat produced by burning of the solid fuel 14 and the pressurized vapor is admitted into the compartment 20. The pressurized vapor acts against the resilient diaphragm 23 and flexes the latter toward the outlet line 24 so that the liquid fuel 15 is forced to the fuel control 17 and thence to the combustor 11.

The system for vaporizing the liquid has been shown in schematic form and comprises a chamber 26 in which the liquid supply 25 is initially contained. A slidable piston 27 is disposed within the chamber and is biased toward a heat exchanger 29 by a compression spring 30. The heat exchanger may take the form of a hollow metal ring which encircles the combustor 11 and which thus is subjected to the heat produced by burning of the solid fuel 14. One end of the heat exchanger 29 communicates with the chamber 26 by means of a line 31 defining a flow restricting orifice while the other end of the heat exchanger communicates with the compartment 20 of the fuel tank 19 by way of a line 34. As a result of the piston 27, the heat exchanger 29 is initially filled with liquid from the chamber 26 and, when such liquid vaporizes, additional liquid is forced from the chamber and into the heat exchanger by the piston. A spring-loaded valve 35 is located at the inlet end of the line 34 and prevents flow out of the heat exchanger 29 until the liquid has been vaporized and the vapor has attained a predetermined high pressure.

Completing the fuel supply system is a line 36 which communicates with the line 34 downstream of the valve 35 and which leads to a compartment 37 adjacent the piston 27. By virtue of the line 36, the pressure of the vapor in the line 34 is transmitted to the piston 27 and forces the latter toward the heat exchanger 29 so as to inject additional liquid into the heat exchanger upon vaporization of part of the liquid. A spring-loaded relief valve 39 is located at one end of the compartment 37 and is adapted, when opened, to vent the compartment 37, the line 36 and the compartment 20 to atmosphere. Accordingly, the relief valve 39 limits the maximum vapor pressure in the compartment 20 and also serves to regulate the pressure behind the piston 27 so as to insure that the liquid 25 is metered into the heat exchanger 29 at a substantially fixed rate.

With the foregoing arrangement, combustion of the solid propellant 14 creates heat which is conducted to the heat exchanger 29 to cause boiling of the liquid 25 therein. When the vapor pressure reaches a sufficiently high magnitude, the valve 35 opens to admit the vapor into the compartment 20 so as to cause the diaphragm 23 to flex and pressurize the fuel 15 in the compartment 21. After all or virtually all of the solid propellant has been burned, liquid fuel from the pressurized tank 19 flows through the nozzles and into the combustor 11. As fuel 15 leaves the compartment 21, additional liquid 25 is vaporized by the heat resulting from the burning of such fuel and thus additional vapor is introduced into the compartment 20 to keep the latter pressurized and to cause the diaphragm 23 to flex and extend to a greater degree and force more fuel from the compartment 21. The fuel supply system thus is self-sustaining in that the heat produced by the burning of the liquid fuel is utilized to pump additional fuel to the combustor.

I claim:

1. A system for supplying fuel to the propulsion combustor of a device having another energy source adapted to be burned to initially propel the device through space, said system comprising a supply of liquid carried by said device, a heat exchanger carried by said device and located to receive said liquid and also to receive heat resulting from the burning of said energy source, said heat exchanger being operable, upon receiving heat, to convert into pressurized vapor the liquid delivered to the heat exchanger, a piston associated with said liquid supply and operable when moved to deliver said liquid to said heat exchanger, means for transmitting part of said pressurized vapor to said piston whereby such vapor moves said piston to effect delivery of said liquid to said heat exchanger, a fuel reservoir containing said fuel and connected to communicate with said combustor, a fluid actuated pumping element associated with said reservoir and operable when actuated to pressurize said fuel and force said fuel from said reservoir to said combustor, and means for delivering pressurized vapor from said heat exchanger to said pumping element when said liquid is heated whereby said vapor actuates said pumping element to effect delivery of said fuel to said combustor.

2. A system as defined in claim 1 in which said pumping element comprises a movable piston disposed within said reservoir and dividing the latter into first and second compartments, said first compartment containing said fuel and being connected to communicate with said combustor, said delivery means establishing communication between said second compartment and said heat exchanger.

3. A system as defined in claim 2 in which said last-mentioned piston is a resiliently flexible diaphragm disposed within said reservoir and serving to seal said first compartment from said second compartment.

4. A system as defined in claim 1 further including a relief valve for limiting the maximum pressure of said pressurized vapor.

5. A missile having a propulsion system and having an energy source adapted to be burned to initially propel the missile through space, a heat exchanger carried by said missile and located to receive heat resulting from the burning of said energy source, a supply of liquid carried by said missile and communicating with said heat exchanger with some of said liquid initially being present in said heat exchanger and being converted into pressurized vapor by the heat resulting from the burning of said energy source, a reservoir containing fuel and connected to communicate with said propulsion system, means for conducting part of said pressurized vapor to said liquid supply to force additional liquid into said heat exchanger, and means for conducting another part of said pressurized vapor to said reservoir to force said fuel out of said reservoir and to said propulsion system.

6. A missile as defined in claim 5 further including a first piston positioned to be acted upon by said part of said pressurized vapor and, as an incident thereto, acting on said liquid to force the latter into said heat exchanger, and a second piston positioned to be acted upon by said other part of said pressurized vapor and, as an incident thereto, acting upon said fuel to force the latter out of said reservoir.

* * * * *